Jan. 27, 1925.
W. F. KOPKE
1,524,480
AUTOMOBILE NONSKID CHAIN
Filed Jan. 7, 1924
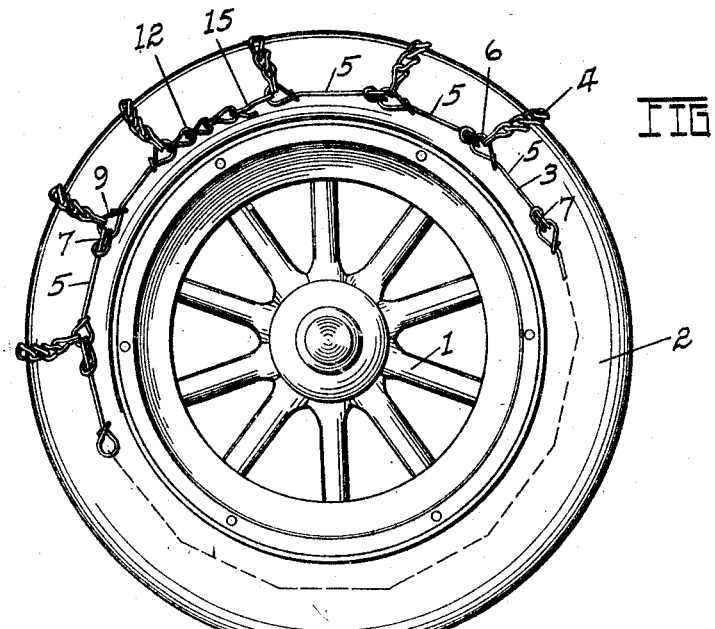
FIG-1-
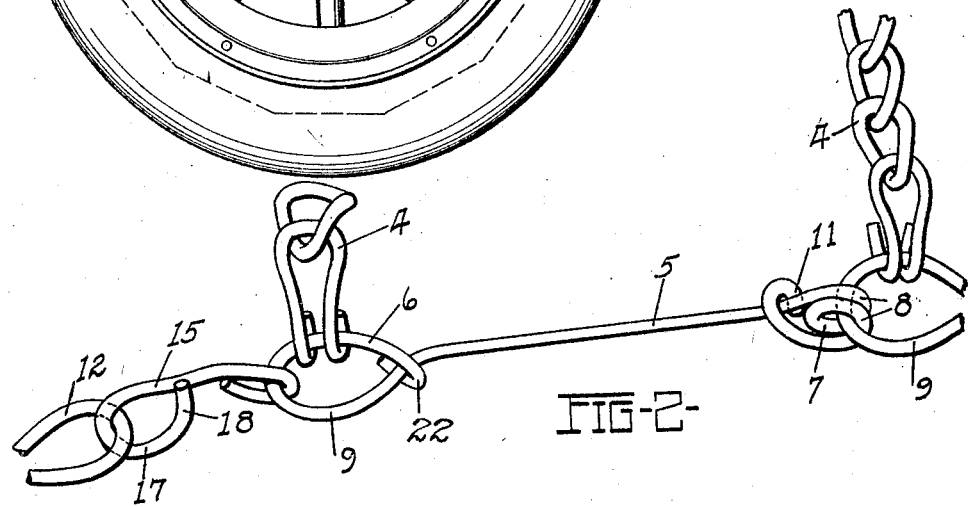
FIG-2-
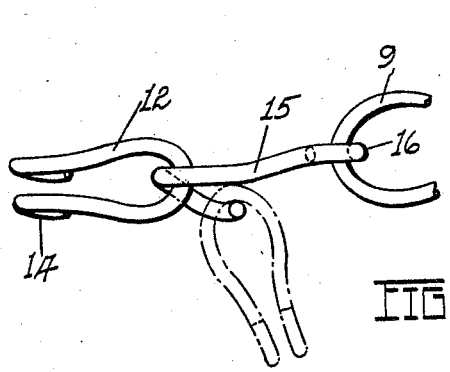
FIG-3-
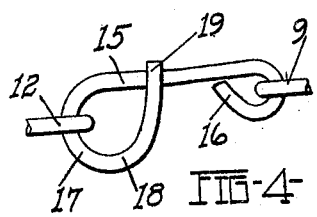
FIG-4-
INVENTOR
William F. Kopke
by
Owen, Owen & Crampton Patented Jan. 27, 1925.

1,524,480

UNITED STATES PATENT OFFICE.

WILLIAM F. KOPKE, OF DUNDEE, MICHIGAN.

AUTOMOBILE NONSKID CHAIN.

Application filed January 7, 1924. Serial No. 684,714.

*To all whom it may concern:*

Be it known that I, WILLIAM F. KOPKE, a citizen of the United States, and a resident of Dundee, in the county of Monroe and State of Michigan, have invented a new and useful Automobile Nonskid Chain, which invention is fully set forth in the following specification.

My invention has for its object to provide an improved non-skid automobile tire chain that is exceedingly durable and will withstand the wear and strains to which such chains are usually subjected. It has been found that the breakage in automobile tire chains is in the side chains that extend around or along the rim of the wheel, because of the angular directions of the strains produced locally on the links that are connected to the cross pieces or chains. This is because of the fact that the strains produced on the said links are not in the directions that the links extend but are at an angle thereto, which multiplies the strain on the link and particularly the loop of the link which tends to spread and wear the link. The loops of the links being small, there is very little yielding of the metal to the strains, which causes the strains to result in a series of shocks and also confines the wear to a very small area.

By my invention, I provide a non-skid chain having side chains, the links of the side chains having large loops that absorb, by reason of their elasticity, the shocks produced in the traction action of the chain as succeeding cross chains come into play and also extend the area over which the cross chains may act, and thus greatly reduce the wear on the loops of the links of the side chains.

The invention also consists in a novel hook for connecting the ends of the side chains together. The invention also consists in providing double loops for increasing the area of contact between adjoining links of the side chains where they connect with the larger loops of the side chains, namely, the loops to which the cross chains are connected, to greatly increase the contact or bearing surfaces between the links of the side chains.

The invention may be contained in chains which in their details vary in form. To illustrate a practical application of the invention, I have selected an automobile non-skid chain containing the invention and shall describe it hereinafter. The chain selected is illustrated in the accompanying drawings.

Figure 1 is a side view of an automobile wheel and tire showing the non-skid chain embodying my invention located thereon. Fig. 2 is an enlarged view of a link of the side chains and also of two of the cross chains. Fig. 3 is a top view of the hook used for connecting the ends of the side chains. Fig. 4 is a side view of the hook shown in Fig. 3.

The non-skid chain embodied in my invention is particularly designed to be used in connection with the ordinary pneumatic tire. In Fig. 1 is shown the wheel 1 having the tire 2 on which the non-skid automobile chain is located. The chain is provided with a number of side chains 3 and the cross chains 4. Each side chain 3 consists of a plurality of links 5. Each link is formed of heavy wire bent at its ends to form the large loops 6 and the small double loops 7. The large loops 6 are each provided with engaging hooks 22 that are bent around the body portion of the link and bent close to the loop portion 6 of the wire so as to close the hook 22. The large loop thus forms a relatively large arc on the side of the loop to which the cross chain 4 is connected. As the wheel travels along the road and there is sufficient traction to bring into play the chains, or when there is any skidding, the cross chains will draw at an angle to the direction of the location of the links of the side chains. This angle varies according to the direction of movement of the automobile body when it skids, although in traction the angular pull of the cross chains on the side chains will be always the same. The large arc of each loop of the side chains permits the links of the cross chains to slide over the arc portion to which the cross chains are connected and take different positions, according to the degree of the traction and according to the direction that the automobile skids. The cross chains, moreover, are connected to the loops of the side chains by links having loops at their ends that surround the arced portions of the loops of the side chains. The large loops enable both of the loops of the links that connect the cross chains with the side chains to bear on the surface of the large loops, which presents at all times an increased contact area or bearing surface between each of the cross chains and the loop to which it is connected. The tendency of the pull of the cross chains, moreover, is to open the loop of the side chains to which they are connected. The hook portions 22 prevent the opening of the loop notwithstanding the greater leverage produced by reason of the large size of the loop.

The double loop of each link of the side chains is formed by the double turn or two turns 8, the parts being so formed that the turns 8 or loops are located in the larger looped end portions 9 of the adjoining link of the side chain. The end of the double looped portion of each link 5 of the side chains is also provided with a hook 11 that surrounds the body portion of the link, the hook being closed so as to form a loop around the body portion. The double loops or turns of each link 5 provide a double bearing or contact surface between the links of the side chains, which greatly extends the life of the chain.

The ends of the side chains are connected together by the links 12 and the hook 15. The links 12 are connected together by loops formed at each end of the wire from which the links are formed, and then doubled together, the loops 14 engaging adjoining links, the looped ends being located around the body portion of the wire that forms the adjoining link, whereby each link is connected to its adjoining link by a double loop.

The hook 15 is connected to the larger loops 9 of the end links of the side chains. Each hook 15 is formed of a looped portion 16 that extends through the larger loop 9 of the end link 5. The other end of the hook 15 is provided with the hook portion 17 that is bent in the form of a loop, the end of which terminates on the side opposite that on which the looped portion 18 is located, and so that when the hook 15 is to be connected to the end link 12, the two must be placed substantially at right angles to each other, that is, as shown in Fig. 3, the link 12 must be placed at an angle to the body portion of the hook 15 in order that the end 19 of the hook may enter the link 12, and furthermore, the link 12 must be turned upside down or turned over, and as the link 12 slides along the loop portion 18, it reverses its position or turns over. In order to unhook the ends of the side chains, it is necessary for the end link 12 to perform the same relative operations in the reverse order. It will thus be seen that it is practically impossible for the ends of the side chains to become disconnected since the natural pull that exists at all times on the side chains, by reason of the cross chains, will prevent gathering of the links 12 sufficiently close together to permit the end link to take the extreme position required to hook and unhook the chains during the running of the automobile.

I claim:—

An automobile non-skid chain, having side chains and cross chains, each link of the side chains having at one end a large loop and an engaging hooked end portion for engaging the body portion of the link at the inner end of the loop, the other end of each link being provided with a double loop formed by a double turn and having an engaging hook for engaging the body portion of the link, a cross chain connected to each of the large loops of the links of the side chains for connecting the side chains and means for connecting the ends of the side chains.

In testimony whereof, I have hereunto signed my name to this specification.

WILLIAM F. KOPKE.